United States Patent [19]

Johnson, Jr. et al.

[11] 4,288,146

[45] Sep. 8, 1981

[54] CURVED REFLECTOR WITH ADJUSTABLE FOCAL LENGTH

[75] Inventors: Alfred L. Johnson, Jr.; Victor A. Peckham, both of Manhattan Beach, Calif.

[73] Assignee: LaJet Energy Company, Abilene, Tex.

[21] Appl. No.: 149,587

[22] Filed: May 14, 1980

[51] Int. Cl.³ .............................................. G02B 5/10
[52] U.S. Cl. .................................................... 350/295
[58] Field of Search ........................ 350/295; 343/915

[56] References Cited

U.S. PATENT DOCUMENTS 4,179,193  12/1979  Gillette et al. .................... 350/295

Primary Examiner—F. L. Evans
Attorney, Agent, or Firm—Roylance, Abrams, Berdo & Farley

[57] ABSTRACT

A curved reflector of electro-magnetic radiation formed of an elastic, reflective membrane which utilizes a partial vacuum to provide the curvature to the membrane and an adjustable valve to vary such curvature, and therefore the focal length of the reflector. The valve comprises a central aperture in the membrane and a body adjustably mounted above the aperture with a flow restricting surface thereon which overlies the aperture.

18 Claims, 10 Drawing Figures

CURVED REFLECTOR WITH ADJUSTABLE FOCAL LENGTH

FIELD OF THE INVENTION

The present invention relates to a curved electromagnetic radiation reflector formed of an elastic, reflective membrane which utilizes a partial vacuum to provide the curvature to the membrane and an adjustable valve to vary such curvature and thus the focal length. The radiation can be, for example, from the sun.

BACKGROUND OF THE INVENTION

In constructing a system for utilizing solar energy, it is highly advantageous to provide a solar reflector that can concentrate the solar energy and aim that concentrated energy at a specific target. This results in a more efficient system and can reduce the size and cost of the overall system.

While various solar reflectors, and reflectors of other electro-magnetic radiation, have been known in the art, they have tended to be heavy and expensive to make. In addition, many of these devices have complicated or imprecise mechanisms for varying the focal length of the reflector.

Such prior art devices are disclosed in U.S. Pat. Nos. 2,952,189, issued to Pajes, on Sept. 13, 1960; 4,033,676, issued to Brantley, Jr. et al, on July 5, 1977; and 4,046,462, issued to Fletcher et al, on Sept. 6, 1977. In addition a variable focal length reflector is disclosed in the article entitled "Variable Focal Length Mirrors", *Review of Scientific Instruments,* Volume 32, No. 2, February, 1961, pages 210-211, by J.C. Muirhead.

SUMMARY OF THE INVENTION

Accordingly, a primary object of the present invention is to provide a reflector of electro-magnetic radiation with an accurately adjustable focal length.

Another object of the present invention is to provide such a reflector which is light weight and inexpensive to make.

Another object of the present invention is to provide such a reflector which can be adjusted by unskilled personnel.

The foregoing objects are basically attained by providing a reflector comprising a hollow housing having an opening; a flexible, elastic reflective membrane; means for coupling the membrane over the opening in a gas-tight manner; evacuation means, coupled to the housing, for creating a partial vacuum in the housing tending to deflect the membrane below a reference plane and into the housing; and valve means, coupled to the housing, for controlling the depth of the deflection of the membrane, the valve means comprising an aperture located in the membrane, and a body mounted adjacent the aperture and having a flow resticting surface extending into the housing a depth equal to the depth of the desired deflection of the membrane relative to the reference plane and overlying the aperture.

By varying the depth of the flow restricting surface relative to the reference plane, a very high accuracy of adjustment of the reflector's focal length is accomplished. Advantageously, the body is in the form of a threaded shaft and can simply be rotated in a threaded sleeve to vary the depth. In addition, the flow restricting surface can advantageously be a curved head coupled on the end of the shaft to provide an inexpensive valve mechanism. By forming the valve of such material and configuration and by making the reflective part of the apparatus from a flexible, elastic membrane, the overall reflector is very light, rugged and inexpensive. The adjustment of the focal length is thus very simply done by unskilled personnel.

Other objects, advantages and salient features of the present invention will become apparent from the following detailed description, which, taken in conjunction with the annexed drawings, discloses preferred embodiments of the present invention.

DRAWINGS

Referring now to the drawings which form a part of this original disclosure;

DETAILED DESCRIPTION OF THE INVENTION

Figure 1:
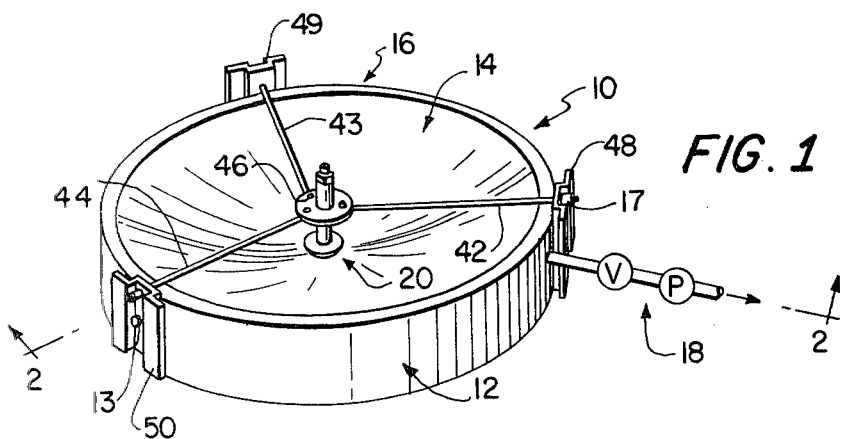
FIG. 1 is a perspective view of the reflector in accordance with the present invention.
Figure 4:
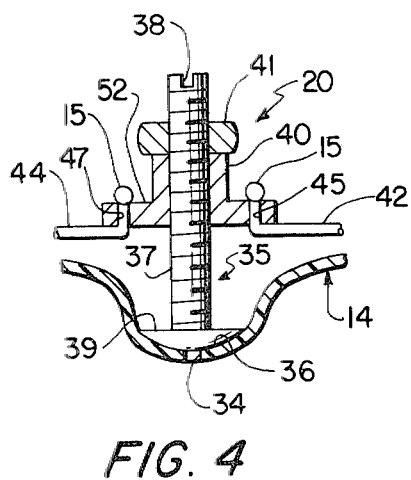
FIG. 4 is a longitudinal sectional view in elevation of the valve mechanism shown in FIG. 2.

Referring now to FIGS. 1-5, the reflector 10 in accordance with the present invention is shown as comprising a hollow housing 12, a flexible, elastic reflective membrane 14, a coupling mechanism 16 for coupling the membrane to the housing in a gas-tight manner, an evacuation assembly 18 for creating a partial vacuum within the housing, and a valve 20 for controlling the depth of the deflection of the membrane 14. By so deflecting the membrane, the focal length of the reflector formed thereby will vary as desired. The reflector can be used with solar radiation, as well as radar, television signals and other electromagnetic radiation.

Figure 2:
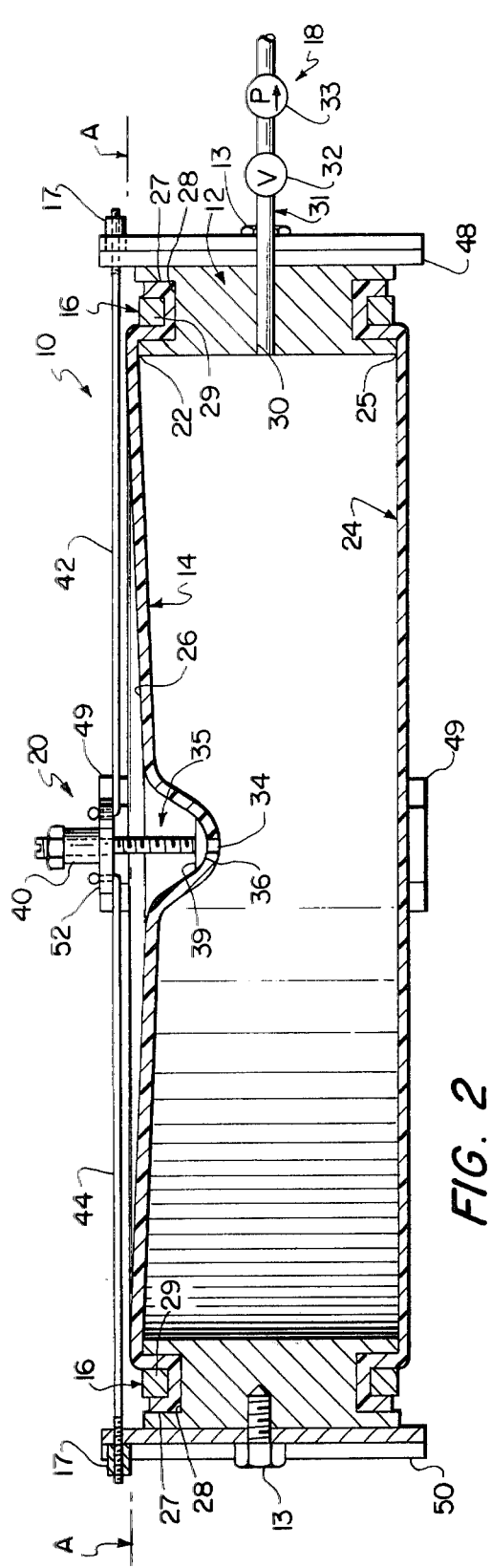
FIG. 2 is a side elevational view in section taken along lines 2—2 in FIG. 1 showing the reflector in its rest position before a partial vacuum is created inside the housing.
Figure 3:
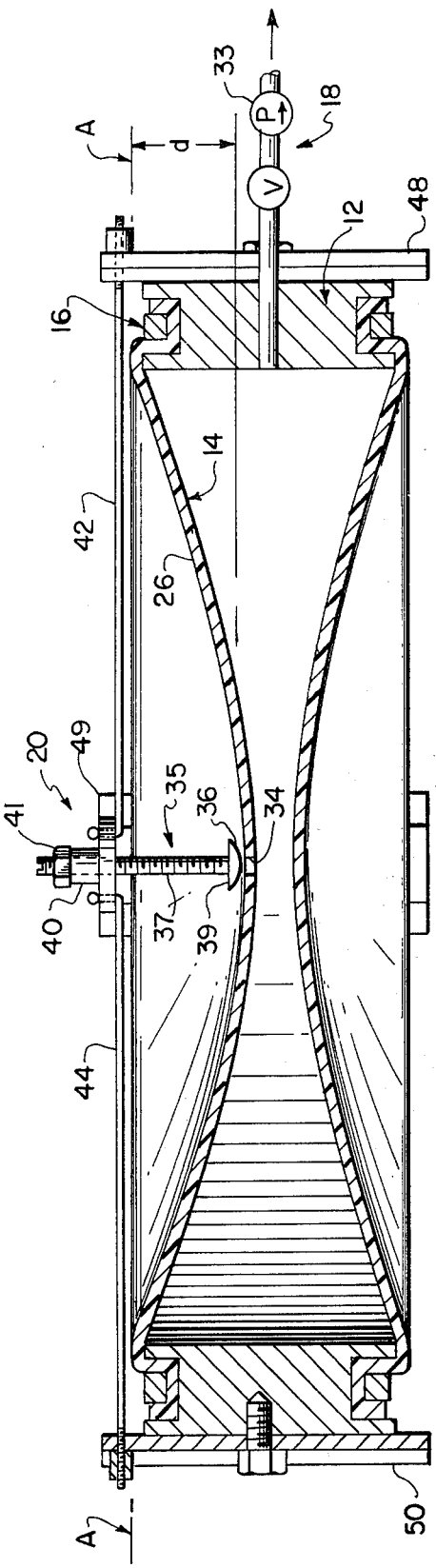
FIG. 3 is a view similar to that shown in FIG. 2 except that a partial vacuum has been created inside the housing, thereby deflecting the reflective membrane into the housing.

The hollow housing 12 is advantageously a right cylindrical tube with at least one circular opening 22 in a plane perpendicular to the axis of the cylindrical housing, seen at the top thereof in FIG. 2. The other end of the housing can be closed by a rigid member or can be closed by a second membrane 24 similar to membrane 14 covering a second opening 25 seen at the bottom of FIG. 2. The two openings 22 and 25 as seen in FIGS. 1–3 are circular, although they could be rectangular with the housing having a rectangular cross-section rather than a cylindrical cross-section as shown.

Membrane 14 has a reflective coating on the exterior surface 26 thereof, which coating can be aluminum by, for example, forming the membrane from aluminized Mylar. The membrane is larger in diameter than opening 22 so that the peripheral portion 27 extends past the opening and therefore completely closes the opening. The membrane can be about 0.0005 to 0.002 inches thick.

The membrane 14 is attached by coupling mechanism 16 to the housing 12 in a gas-tight manner by means of an annular groove 28 formed in the top surface of the end of housing 12 with the peripheral portion 27 being received therein and with an attaching ring 29 being received over the peripheral portion 27 of the membrane and in the annular groove 28. Thus, the peripheral portion 27 is interposed between the annular groove 28 and the attaching ring 29 to maintain the membrane 14 coupled to the housing 12 in a gas-tight manner. Advantageously, the membrane 14 is initially somewhat stretched when it is coupled to the housing 12 so that if undisturbed it would lie in a reference plane A shown in FIG. 2, which essentially corresponds to the plane containing the circular opening 22 in housing 12. A plurality of fasteners can be utilized to rigidly secure the attaching ring 29 to the housing 12 if necessary.

The evacuation assembly 18 comprises an orifice 30 in the wall of the housing 12, a fluid line 31 received in the orifice, a valve 32 located in fluid line 31 and a pump 33 located in the fluid line 31 downstream of valve 32. Valve 32 can be a needle valve or merely a restrictor tube located in fluid line 31 to limit the air flow rate out of the housing to a level equal to or less than the air flow rate into the housing through the aperture.

As seen in FIGS. 2 and 3, the second membrane 24 is coupled in a gas-tight manner over the second opening 25 in housing 12 in a manner similar to coupling mechanism 16. The benefit of constructing the bottom of the housing in such a fashion is a reduction in weight, material and cost. This membrane need not, but can be, reflective.

The valve 20 is basically comprised of an aperture 34 centrally located in membrane 14 and a body 35 mounted adjacent the aperture and having a flow restricting surface 36 extending into the housing a depth equal to the depth of the desired deflection of the center of the membrane relative to the reference plane A and overlying the aperture 34. With a membrane 14 having a radius of about three feet, the diameter of the aperture 34 is advantageously one-eighth inch. Preferably, the aperture 34 is circular. The aperture does not have to be in the center of the membrane, but this is preferred.

The body 35, as best seen in FIGS. 2–5, comprises an externally threaded shaft or rod 37 which has a transverse slot 38 at the end remote from aperture 34 and an enlarged portion 39 in the form of a curved head having the flow restricting surface 36 adjacent aperture 34. This enlarged portion 39 is in the form of a portion of a sphere and the radius of curvature thereof is preferably substantially equal to or slightly less than the radius of curvature of the membrane 14 in its deflected position. By making the enlarged portion 39 with a curved flow restricting surface less stress is placed on the aperture 34 and there is less of an alignment problem as seen in FIGS. 2–5. With a one-eighth inch aperture, the head can have a diameter of about two inches.

The body 35 is mounted adjacent the aperture by means of an internally threaded sleeve 40 threadedly receiving the externally threaded shaft 37 of body 35. An internally threaded locking nut 41 threadedly receives the shaft 37 to lock the shaft to the sleeve 40 in the desired position.

As seen in FIGS. 2–5, the sleeve 40 carrying the body 35 is coupled to the housing and mounted adjacent the aperture 34 by means of a plurality of elongated members in the form of spokes 42, 43 and 44 which have bent ends received in aperture 45, 46 and 47 in the flange 52 extending from sleeve 40, and rigidly coupled at their other ends to brackets 48, 49 and 50, which are secured to housing 12 by bolts 13. These elongated members can also be wire or ribbon and in the operative position shown in FIG. 3 lie in a plane substantially parallel to the reference plane A. The bent ends of the elongated members have enlarged beads 15 to hold them in apertures 45–47. The other ends of the elongated members are threaded, received in suitable bores in brackets 48–50 and secured by nuts 17.

Operation

As seen in FIG. 2, the pump 33 has not yet been activated so there is no partial vacuum created inside the hollow housing 12. In this condition, the body 35 exerts a downward pressure on membrane 34 at the central aperture 34 because of the substantially rigid connection of the body 35 to the housing 12 via elongated members 42–44, so the membrane 14 assumes a substantially conical configuration with a deformed center.

In this configuration, the elongated members may extend somewhat upwardly out of a common plane.

In order to deflect the membrane 14 inwardly of the housing, pump 33 is activated thereby creating a partial vacuum in the interior of the housing 12 since the flow restricting surface 36 restricts the air flow through aperture 34. The membrane 14 will then be drawn into the housing and assume a curved position as seen in FIG. 3, the depth of the deflection of the center of the membrane 14 being determined by the depth from the reference plane A of the flow restricting surface 36 on body 35.

Figure 5:
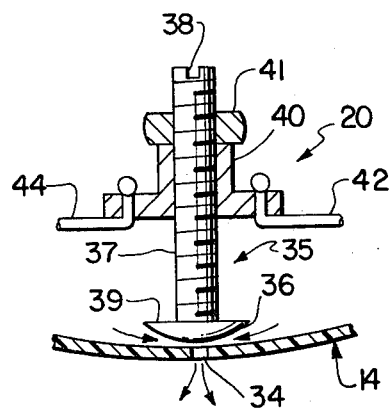
FIG. 5 is a longitudinal sectional view of the valve mechanism shown in FIG. 3.

Thus, as seen in FIG. 5, the partial vacuum created by pump 33 will continue to draw the membrane 14 inwardly of the housing 12 until there is a small space between the flow restricting surface 36 and aperture 34 which would allow ambient air to flow therethrough.

As seen in FIG. 3, the center of the membrane is deflected a depth d below the reference plane A. In order to increase the depth of the deflection, the body 35 is rotated relative to sleeve 40 so that the flow restricting surface 36 moves downwardly. An opposite rotation will decrease the amount of deflection. The locking nut 41 aids in locking the body 35 relative to sleeve 40 so that an accurate deflection can be maintained.

By so adjusting the body 35, the focal length of the reflector 10 is easily and accurately modified, especially by unskilled personnel working in the field.

Figure 6:
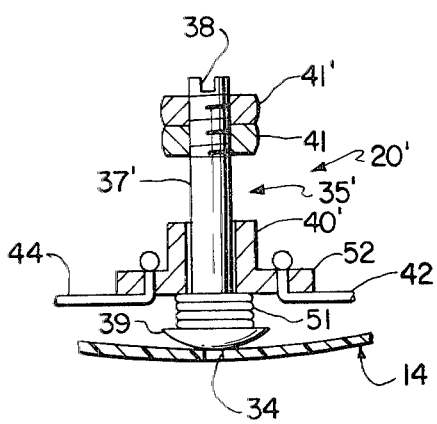
FIG. 6 is a modified embodiment of the valve mechanism in accordance with the present invention in longitudinal section in which a partial vacuum has not been created in the housing.
Figure 7:
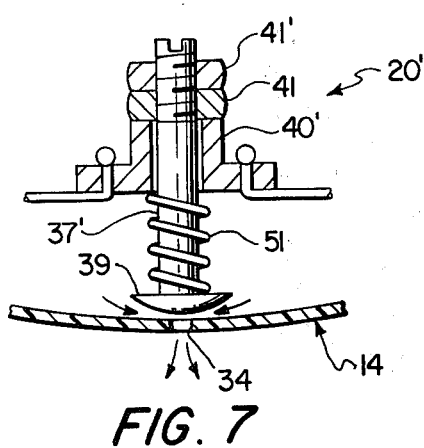
FIG. 7 is a view similar to that shown in FIG. 6 except that a partial vacuum has been created inside the housing.

Embodiment of FIGS. 6 and 7

As seen in FIGS. 6 and 7, a modified embodiment of the valve for the present invention is shown in which the body is not externally threaded, the sleeve is not internally threaded and there is a spring interposed between the sleeve and the enlarged head portion of the body. Thus, the body and the enlarged head portion can move upwardly as shown in FIG. 6 when no partial vacuum is created inside the housing to remove stress from the membrane. However, when the partial vacuum is created, the spring urges the enlarged head portion downward into contact with the deflected membrane, as seen in FIG. 7.

In particular, the modified valve 20' shown in FIG. 6 comprises a body 35' including a cylindrical shaft or rod 37' having external threads at the top thereof and a transverse slot 38 at the uppermost portion and an enlarged head portion 39 similar to that described above regarding FIGS. 1–5. Received on the externally threaded portion of shaft 37' are two internally threaded locking nuts 41 and 41'. Sleeve 40' has an internal bore receiving the shaft 37' therein, the internal bore being smooth and unthreaded so that the shaft 37' can freely move therethrough. Interposed between the bottom of sleeve 40' and the top of the enlarged head portion 39 is a compression spring 51 which tends to bias the head portion 39 downwardly and into the hollow housing of the reflector.

In the view shown in FIG. 6, no partial vacuum is created and the membrane 14, due to its elasticity, has pushed the body 35' upwardly so that the enlarged head portion 39 compresses the spring 51 against the bottom of the sleeve 40'.

In FIG. 7, a partial vacuum has been created and the spring 51 tends to urge the enlarged head portion 39 downwardly, this downward extent being limited by locking nut 41 as it contacts the top of sleeve 40'. In order to adjust the depth of penetration of the enlarged head 39 into the hollow housing, the shaft 37' is rotated relative to locking nut 41. The additional locking nut 41' locks the shaft 37' so that the desired depth adjusted by the operator of the reflector remains until it is desired to change it.

Figure 8:
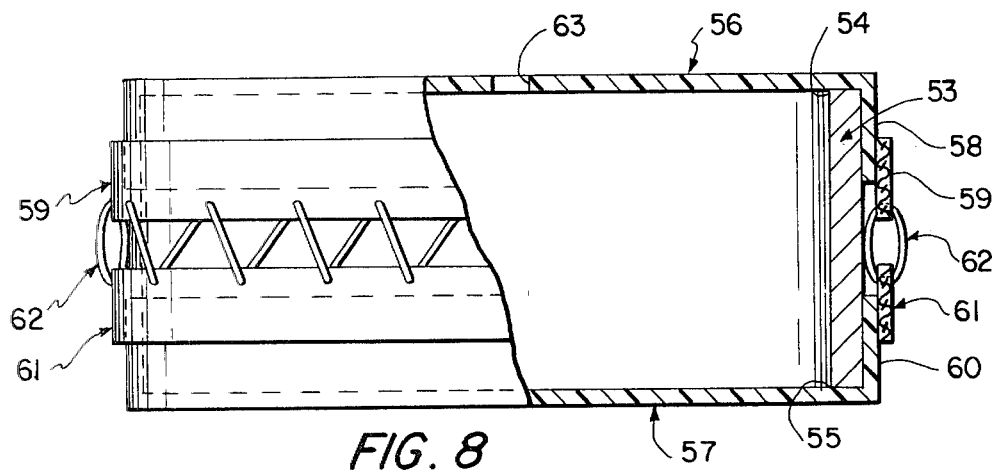
FIG. 8 is a modified embodiment of the mechanism for coupling the reflective membrane to the housing in accordance with the present invention in side elevation and partial section.

Embodiment of FIG. 8

As seen in FIG. 8, a modified embodiment of the coupling mechanism for coupling the membrane to a hollow housing is illustrated. In this embodiment, the hollow housing 53 is cylindrical and has a first circular opening 54 at the top shown in FIG. 8 and a second circular opening 55 at the bottom. A first membrane 56 covers the first opening and a second membrane 57 covers the second opening. A peripheral portion 58 of the first membrane 56 extends over the housing 53 and has a fabric strip 59 adhered thereto. Similarly, the peripheral portion 60 of the second membrane 57 extends over the hollow housing and has a fabric strip 61 adhered thereto. These fabric strips are coupled together, preferably by stitching 62. This coupling is made taut so that the connection of the membranes to the hollow housing is gas-tight. An aperture 63 is centrally located in the first membrane 56, this apparatus working in a fashion similar to that described above regarding the embodiment of FIGS. 1–5, although for reasons of simplicity the valve has not been shown in FIG. 8.

While the strips 59 and 61 are shown and described above as being formed of fabric, they can be formed of any suitable reinforcing material which can be adhered to the membranes and then coupled together.

Figure 9:
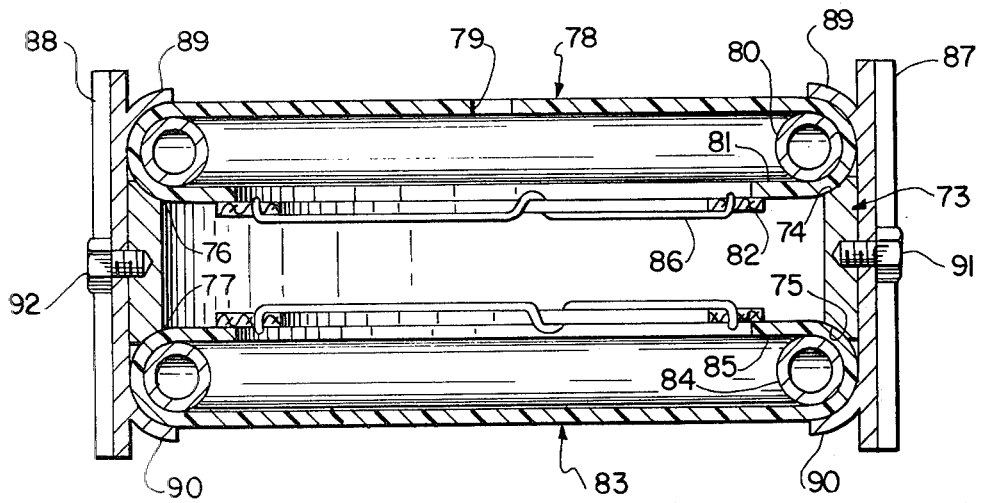
FIG. 9 is a further modified embodiment of the mechanism for coupling the reflective membrane to the housing in accordance with the present invention in longitudinal section.

Embodiment of FIG. 9

A further modified coupling mechanism for coupling the membrane to the housing is illustrated in FIG. 9. In this embodiment, the hollow housing 73 is essentially cylindrical having a first annular recess 74 at the top and a second annular recess 75 at the bottom formed by reducing the inner diameter of the cylindrical housing. The first annular recess 74 defines a first opening 76 and the second annular recess 75 defines a second opening 77. A first membrane 78, having a central aperture 79 therein, is received over a first hollow support ring 80 with a peripheral portion 81 extending around the ring 80 and adhered to a ring of fabric 82. The fabric is stitched by stitching 86 to make the membrane taut about the ring. The peripheral portion and ring are received in annular recess 74 with the membrane interposed therebetween. Adhesive is interposed between the peripheral portion and the recess to secure the membrane to the housing.

A similar coupling of a second membrane 83 to a second support ring 84 is provided at the bottom of housing 73, as seen in FIG. 9, with a peripheral portion 85 of membrane 83 being interposed between the annular recess 75 and ring 84.

First and second clamps in the form of brackets 87 and 88 are provided to add support to the coupling of the membranes to the housing. These brackets are rigidly coupled to the housing with curved arms 89 and 90 extending therefrom receiving the two supporting rings with the membrane interposed therebetween. Fasteners 91 and 92 are used to rigidly couple the brackets to the housing. Although only two brackets are shown in FIG. 9, additional brackets can be used. In this regard, these brackets can be used to support the valve utilized with the structure shown in FIG. 9 in which the elongated members discussed above regarding FIGS. 1–5, can be coupled to these brackets.

Figure 10:
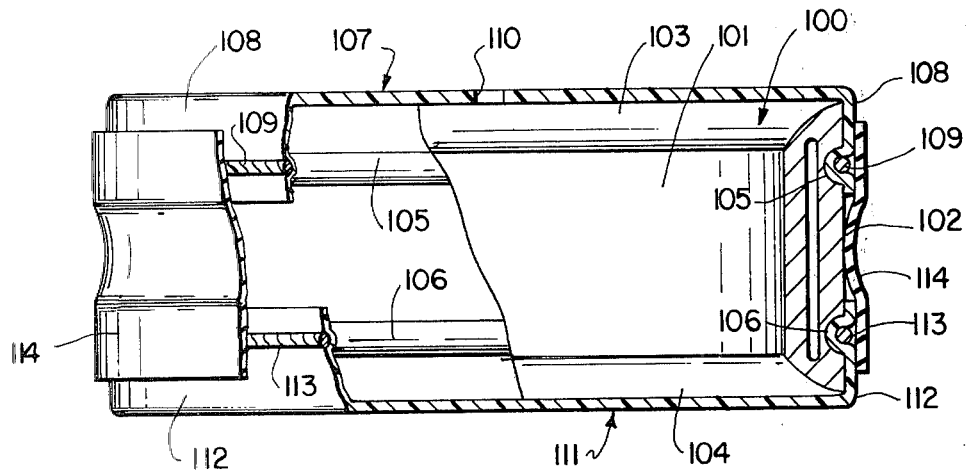
FIG. 10 is another modified embodiment of the mechanism for coupling the reflective membrane to the housing in accordance with the present invention in side elevation and partial section.

Embodiment of FIG. 10

Another modified coupling mechanism for coupling the membrane to the housing is shown in FIG. 10. In this embodiment, the hollow housing 100 is substantially cylindrical having a shorter interior cylindrical surface 101 coupled to a longer exterior cylindrical surface 102 by two curved annular surfaces 103 and 104, which define top and bottom openings of the housing. The housing is advantageously formed as a laminate with a hollow center. On the exterior surface 101 are two annular grooves 105 and 106.

A top membrane 107 is stretched over the top opening and a peripheral edge 108 is extended down along the exterior surface 102 past the top groove 105. A wire 109 is positioned around the membrane peripheral edge and is received in the groove 105 with the peripheral edge interposed therebetween, thereby securing the membrane to the housing. The wire is pulled tightly and its ends twisted around each other. Membrane 107 has an aperture 110 therein as part of the valve described above regarding FIGS. 1–5.

The bottom membrane 111 has a similar peripheral edge 112 secured in groove 106 by a second wire 113.

A band of adhesive tape 114 is finally received around the housing enclosing the wires therein.

While various embodiments have been chosen to illustrate the invention, it will be understood by those skilled in the art that various changes and modifications can be made therein without departing from the scope of the invention as defined in the appended claims.

What is claimed is:

1. A reflector comprising:
a hollow housing having an opening;
a flexible, elastic reflective membrane;
means for coupling said membrane over said opening in a gas-tight manner;
evacuation means, coupled to said housing, for creating a partial vacuum in said housing tending to deflect said membrane below a reference plane and into said housing; and
valve means, coupled to said housing, for controlling the depth of the deflection of said membrane,
said valve means comprising
an aperture located in said membrane, and
a body mounted adjacent said aperture and having a flow restricting surface extending into said housing a depth equal to the depth of the desired deflection of said membrane relative to the reference plane and overlying said aperture.

2. A reflector according to claim 1, wherein said flow restricting surface is curved.

3. A reflector according to claim 1, wherein said flow restricting surface is a portion of a spherical surface.

4. A reflector according to claim 1, wherein said aperture is centrally located in said membrane.

5. A reflector according to claim 1, wherein said valve means further comprises
a sleeve, and means, coupled to said housing, for mounting said sleeve above said aperture,
said body being received in said sleeve.

6. A reflector according to claim 5, wherein said sleeve has a threaded inner surface, and said body has a threaded outer surface for threaded engagement with said sleeve inner surface.

7. A reflector according to claim 5 and further comprising
an internally threaded nut threadedly received on the threaded outer surface of said body and in contact with an end of said sleeve.

8. A reflector according to claim 5, wherein said body has an enlarged portion, and
further comprising a tension spring surrounding said body and located between said sleeve and said enlarged portion.

9. A reflector according to claim 5, wherein said body has a transverse slot at one end.

10. A reflector according to claim 5, wherein said means for mounting said sleeve comprises
a plurality of elongated members, each member coupled at one end to said sleeve and coupled at the other end to said housing,
said elongated members lying in a plane substantially parallel to said reference plane.

11. A reflector according to claim 1, wherein said valve means further comprises
means for adjusting the depth of said flow-restricting surface relative to the reference plane.

12. A reflector according to claim 1, wherein said housing has a second opening, and
further comprising a second flexible, elastic reflective membrane and second means for coupling said second membrane over said second opening in a gas-tight manner.

13. A reflector according to claim 1, wherein said housing is cylindrical having an annular groove therein adjacent said opening, and p1 said means for coupling said membrane over said opening comprises a ring received in said groove with said membrane being interposed between said ring and said groove.

14. A reflector according to claim 1, wherein said housing is cylindrical having an end of reduced diameter defining an annular recess on the interior thereof defining said opening,
said means for coupling said membrane over said opening comprising a ring receiving said membrane thereover, said ring being received in said annular recess with said membrane interposed therebetween.

15. A reflector according to claim 14, and further comprising
a clamp rigidly coupled to said housing and having a portion receiving said ring therein with said membrane interposed therebetween.

16. A reflector according to claim 12, wherein said means for coupling said membrane over said opening and said second means for coupling said second membrane over said second opening comprise reinforcing strips coupled to each of said membranes and stitching interconnecting said strips.

17. A reflector according to claim 1, wherein said housing is cylindrical and has an annular groove on the exterior surface thereof, and
said means for coupling said membrane over said opening comprises a wire received in said groove with said membrane being interposed between said wire and said groove.

18. A reflector comprising:
a hollow housing having first and second openings;
a first flexible, elastic membrane;
a second flexible, elastic reflective membrane;
first means for coupling said first membrane over said first opening in a gas-tight manner;
second means for coupling said second membrane over said second opening in a gas-tight manner;
evacuation means, coupled to said housing, for creating a partial vacuum in said housing tending to deflect said first and second membranes relative to a reference plane and into said housing; and
valve means, coupled to said housing, for controlling the depth of the deflection of said membranes,
said valve means comprising
an aperture located in said first membrane, and
a body mounted adjacent said aperture and having a flow restricting surface extending into said housing a depth equal to the depth of the desired deflection of said first membrane relative to the reference plane and overlying said aperture.

* * * * *